(12) United States Patent
Sato et al.

(10) Patent No.: US 7,172,542 B2
(45) Date of Patent: Feb. 6, 2007

(54) TOOL CHANGING DEVICE AND TOOL CLEANING METHOD

(75) Inventors: Naoki Sato, Yamanashi (JP); Akihiko Fujimoto, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 67 days.

(21) Appl. No.: 10/887,912

(22) Filed: Jul. 12, 2004

(65) Prior Publication Data
US 2005/0032615 A1 Feb. 10, 2005

(30) Foreign Application Priority Data
Aug. 6, 2003 (JP) .............................. 2003/288044

(51) Int. Cl.
*B23Q 3/157* (2006.01)
*B23Q 11/00* (2006.01)
(52) U.S. Cl. .............................. 483/1; 483/13; 483/39; 483/68; 15/405; 15/415.1; 29/39
(58) Field of Classification Search .................... 483/1, 483/13, 39, 31, 56, 54, 65–68; 409/137, 409/134, 135–136; 408/61, 56, 60; 15/322, 15/354, 300.1, 405, 415.1; 29/35.5, 39, 40–42
See application file for complete search history.

(56) References Cited

U.S. PATENT DOCUMENTS 4,164,879 A * 8/1979 Martin .......................... 82/158
4,237,595 A * 12/1980 Kitamura ..................... 29/26 A
4,404,728 A * 9/1983 Ishikawa ....................... 483/13
5,107,910 A * 4/1992 Sasaki ......................... 144/48.1
6,409,641 B1 * 6/2002 Hashimoto .................... 483/13

(Continued)

FOREIGN PATENT DOCUMENTS

EP      0 855 245 A1    7/1998

(Continued)

OTHER PUBLICATIONS

Machine translation of the specification of EP-855245 A1, 4 pages.*

(Continued)

*Primary Examiner*—Erica Cadugan
(74) *Attorney, Agent, or Firm*—Staas & Halsey LLP

(57) ABSTRACT

A tool changing device and a tool cleaning method capable of surely removing foreign matter such as swarf adhered to tapered portions and/or flange portions of tools, which serve as contact faces to be in contact with a spindle. There is arranged tool cleaning nozzles for spouting coolant on both sides of the spindle in the rotating position of a turret. The tool cleaning nozzle has a position and a posture such that the coolant spouted from the nozzle hits against the tapered portions and/or the flange portions of the tools held by the turret. The coolant is spouted from the tool cleaning nozzle with the rotation of the turret at the time of tool selection. Each time the turret rotates, the tapered portions and/or the flange portions of the tools held by the turret are cleaned by the coolant. Even if foreign matter, such as swarf, is adhered to the standby tools held by the turret, it is possible to surely remove the foreign matter, such as swarf, since the tools are cleaned during the rotation of the turret.

5 Claims, 5 Drawing Sheets

U.S. PATENT DOCUMENTS

2002/0029447 A1* 3/2002 Forst .......................... 29/40
2005/0009679 A1* 1/2005 Fujimoto et al. ............ 483/13

FOREIGN PATENT DOCUMENTS

| JP | 52-49579 | 12/1977 |
|---|---|---|
| JP | 2000-52185 | 2/2000 |
| JP | 2001-018144 | 1/2001 |
| JP | 2001-198761 | 7/2001 |
| JP | 2002-273640 | 9/2002 |
| JP | 2002-292539 A * | 10/2002 |

OTHER PUBLICATIONS

Machine Translation of JP-292539-A, 13 pages.*
First Office Action in corresponding Chinese Patent Application No. 2004100584057 issued Nov. 15, 2005.
Notification of Grounds for Rejection issued by the Japanese Patent Office for Application No. 288044/2003; Ref. No. 21839P; Dispatch No. 484152; Dispatch Date: Dec. 27, 2005.

* cited by examiner

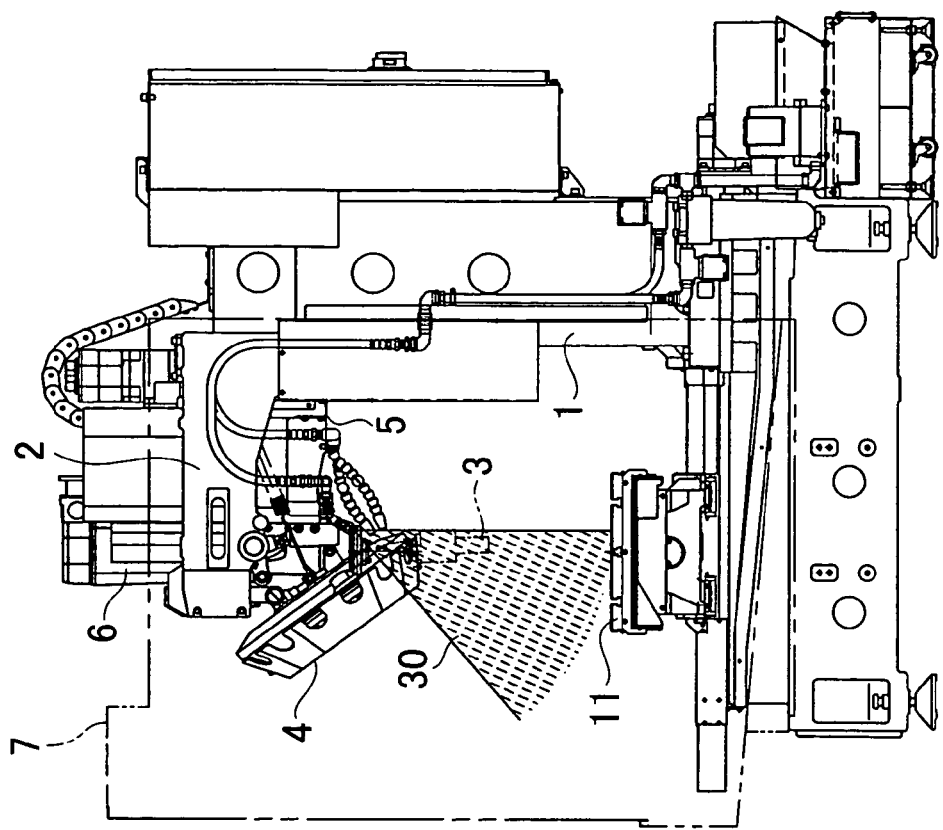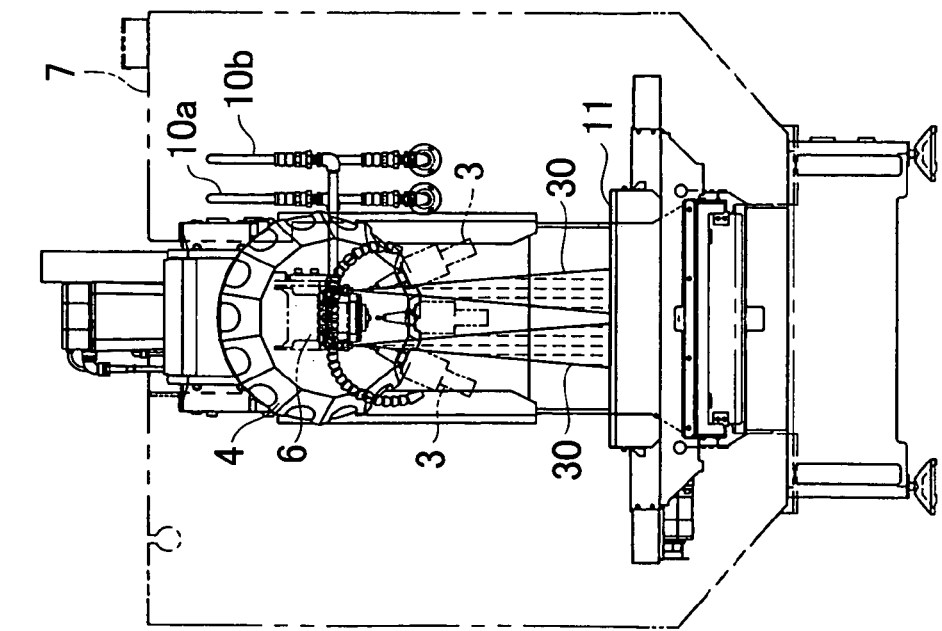

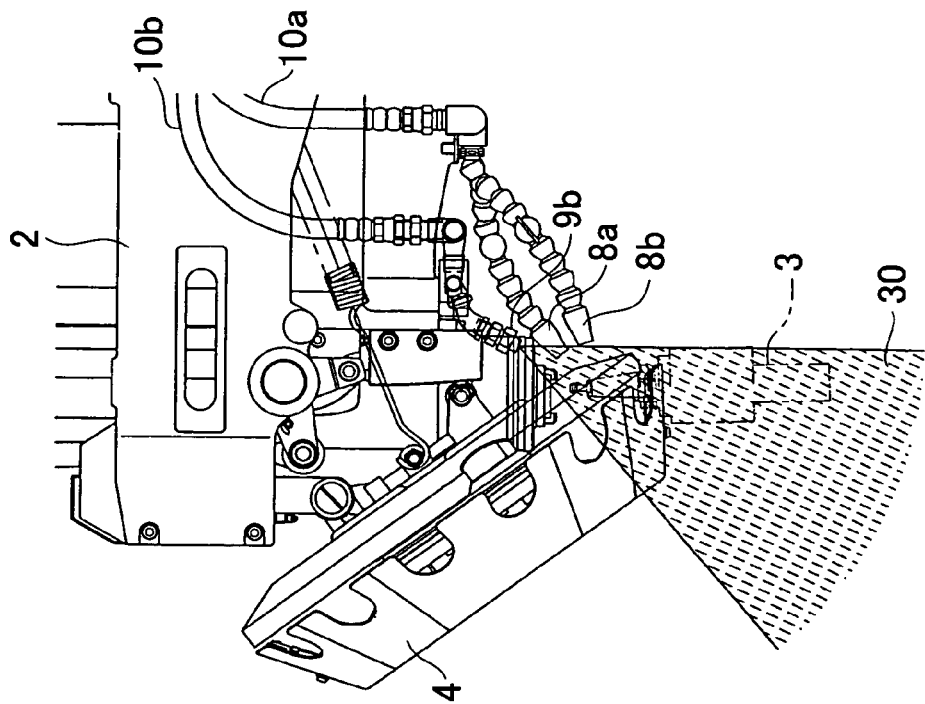
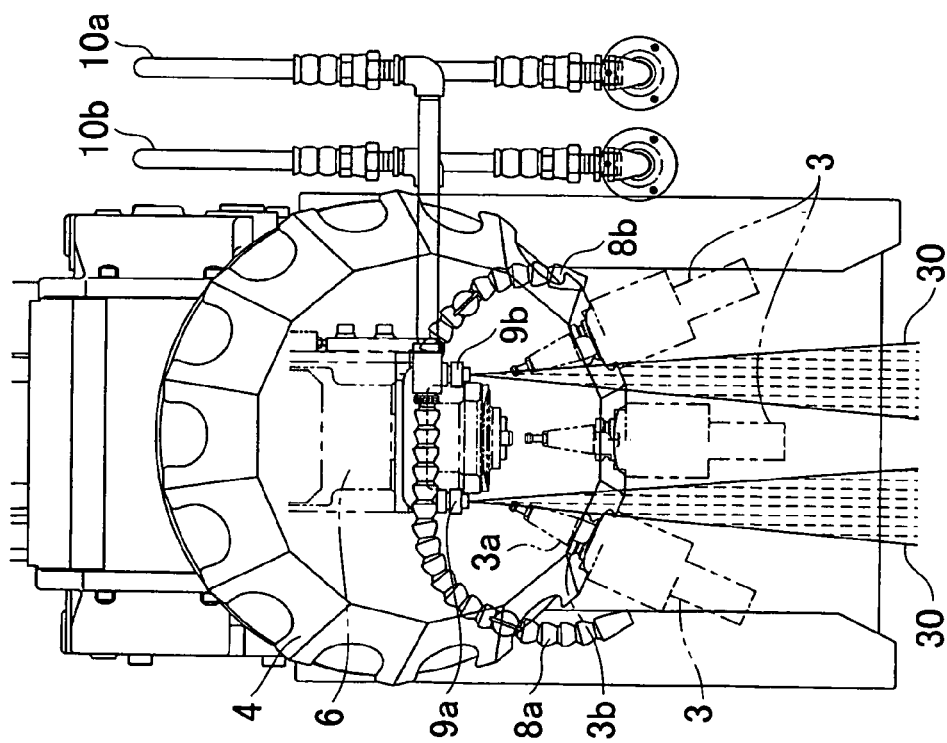

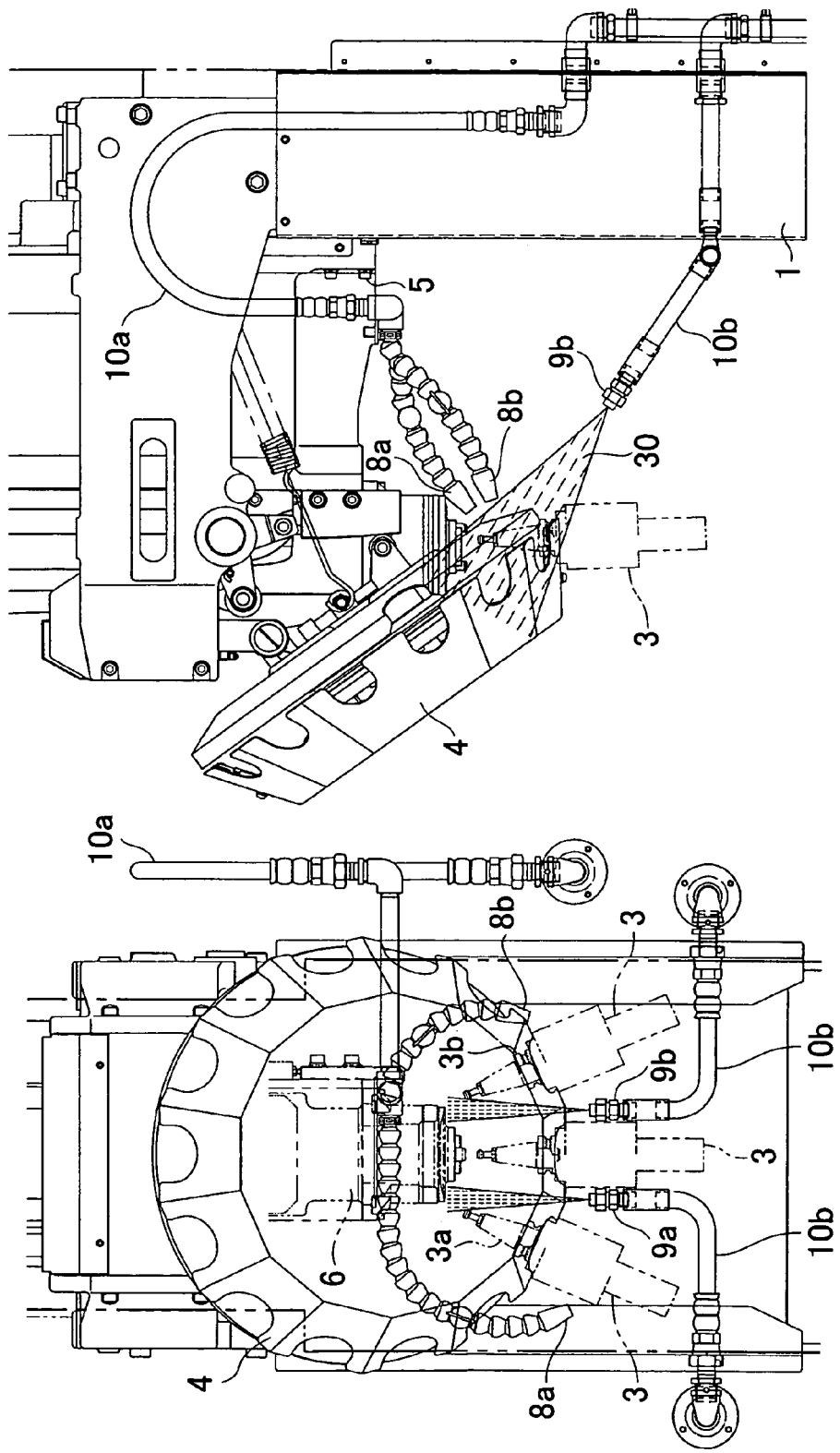

TOOL CHANGING DEVICE AND TOOL CLEANING METHOD

BACKGROUND OF THE INVENTION

1. Field of the Invention

The present invention relates to a tool changing device for a machine tool and a method of cleaning tools held by a turret or magazine of the tool changing device.

2. Description of the Related Art

In changing a tool of a machine tool, machining accuracy of a workpiece is maintained by properly fitting and attaching the tool to a spindle of the machine tool. In a machine tool having a tool changing device, however, tools held by a turret or a magazine are arranged close to a machining area where a workpiece is cut. Therefore, there is a high possibility that swarf produced by cutting of a workpiece is adhered to the tools held by the turret or the magazine. If foreign matter, such as swarf, is adhered to a contact surface of the tool with the spindle, a tool holder may not be properly fitted to the spindle, which affects the machining accuracy. For this reason, the method generally employed is one in which a taper portion and a flange portion of the tool, which are contact surfaces to be in contact with the spindle, are cleaned by removing swarf and the like therefrom using fluid, such as air and coolant liquid.

For instance, there is a well-known method in which after a tool is detached from a spindle and stored in a tool magazine, the swivel plate of the tool magazine is rotated. A tool-holding portion holding the detached tool is then transferred to the position in which tool-cleaning means is arranged, thereby cleaning the tool by cleaning liquid (JP 2001-198761A).

There is also a well-known cleaning device in which when a tool is fitted to a spindle in a tool changing process, coolant is sprayed onto the taper of the tool, which is tightly fitted to the tapered face of the spindle, to thereby remove and clean up the adhered swarf and the like (JP 2002-273640A).

Moreover, there is another known device in which when the flange face of a tool is brought into contact with the end face of a spindle, and at the same time a double fit-type tool for fitting a shank portion into the fitting hole of the spindle is utilized, a tool for cleaning the spindle end face is provided and fixed to the spindle, leaving a space between the spindle end face and the flange face of the tool for cleaning the spindle end face. Cleaning liquid is supplied to the space, which removes foreign matter, such as swarf, from the spindle end face and thus cleans the spindle end face (JP 2001-18144A).

There is further another known device in which an air nozzle is arranged to open in the tapered portion of a spindle, which is to be fitted to the tapered portion of a tool holder. In detaching a tool holder from the tapered portion of the spindle or when a new tool is attached to the spindle, the pressurized air is supplied from a pressurized air supply onto the contact face of the tool holder and that of a spindle taper hole through an air hole formed at the spindle and the air nozzle. Thus, swarf and the like adhered to the tapered portions of fitting faces of the tool holder and spindle are removed and cleaned up by using air (JP 52-49579A).

The turret and magazine of the tool changing device are arranged near a cutting area. Therefore, the swarf scattered during machining is adhered to the tapered portion and flange portion of the tool that is accommodated and held by the turret or magazine. As a result, even if the tapered portion and flange portion of the tool, which are contact faces to be in contact with the spindle, are cleaned after the use of the tool, foreign matter, such as swarf, is adhered thereto during a standby period. If the tool is attached to the spindle and used with the foreign matter adhered thereto, there occur problems that the machining accuracy is deteriorated and that the spindle and the tapered and flange portions of the tool get scratches. Such problems are likely to be considered to be solved if only the contact faces, namely the tapered portion and the flange portion, which are to be in contact with the spindle, are cleaned right before the use of the tool as described in JP 2001-198761A and JP 52-49579B.

In case that the machining is performed using coolant, however, swarf adhered to a standby tool in the turret or magazine adheres persistently to the tapered or flange portion of the tool in time due to the concentrated high-viscosity coolant. Even the cleaning process using the coolant or the like cannot completely remove such swarf.

Likewise, in case of dry machining or machining using air, the amount of swarf adhered to the tool in the turret or magazine is increased by static electricity and the like, so that it is impossible to completely remove the swarf by performing the cleaning process using air.

SUMMARY OF THE INVENTION

The present invention provides a tool changing device and a tool cleaning method capable of surely removing foreign matter, such as swarf, adhered to a tapered portion and/or a flange portion of a tool which are contact faces to be in contact with the spindle.

A tool changing device of the present invention comprises: a turret or magazine for holding tools to be used changeably in a machine tool; and one or more nozzles each for spouting coolant or air toward a region where the tools held by the turret or magazine pass in rotation of the turret or magazine.

The nozzles may be located at both sides of a spindle of the machine tool to have positions and postures such that the coolant or air spouted from each nozzle is directed toward a region where tapered portions of the tools held by the turret or magazine pass in rotation of the turret or magazine. Alternatively, the nozzles may have positions and postures such that the coolant or air spouted form each nozzle is directed toward a region where the tapered portions and also flange portions of the tools held by the turret or magazine pass in rotation of the turret or magazine.

A tool cleaning method of the present invention comprises: providing one or more nozzles each for spouting coolant or air toward a region where tools held by a turret or magazine of a tool changing device pass in rotation of the turret or magazine; and spouting the coolant or air from the nozzle while the turret or magazine is rotated, so that tapered portions of the tools are cleaned by subjecting the tools to the spouted coolant or air when the tools pass the region toward which the coolant or air is spouted. Alternatively, the spouting of the coolant or air may be performed so that the tapered portions and also flange portions of the tools are cleaned by subjecting the tools to the spouted coolant or air when the tools pass the region toward which the coolant or air is spouted. Thus, foreign matter such as swarf adhered to the tapered portion of the tool or to the tapered portion and also the flange portion is removed.

The spouting of the coolant or air may be performed when the turret or magazine is rotated for selecting a tool to be used, to thereby clean the tools held by the turret or magazine each time when the tool selection is carried out.

By subjecting the tools held by the turret or magazine to the coolant or air spouted from the nozzle while the turret or magazine is rotated, the foreign matter such as swarf adhered to the tapered portion and/or the flange portion of the tools in a standby state is securely removed. This results in more reliable removal of the foreign matter from the tapered portion and/or the flange portion of the tool as contact faces to be in contact with a spindle of the machine tool.

BRIEF DESCRIPTION OF THE DRAWINGS

FIGS. 1a and 1b are an elevation view and a side view, respectively, showing a machine tool employing a first embodiment according to the present invention;

FIGS. 2a and 2b are an enlarged front view and a right side view, respectively, showing a tool changing device of the first embodiment;

FIGS. 3a and 3b are an enlarged elevation view and a side view, respectively, showing a substantial part of a second embodiment according to the present invention;

DETAILED DESCRIPTION

Figure 4B:
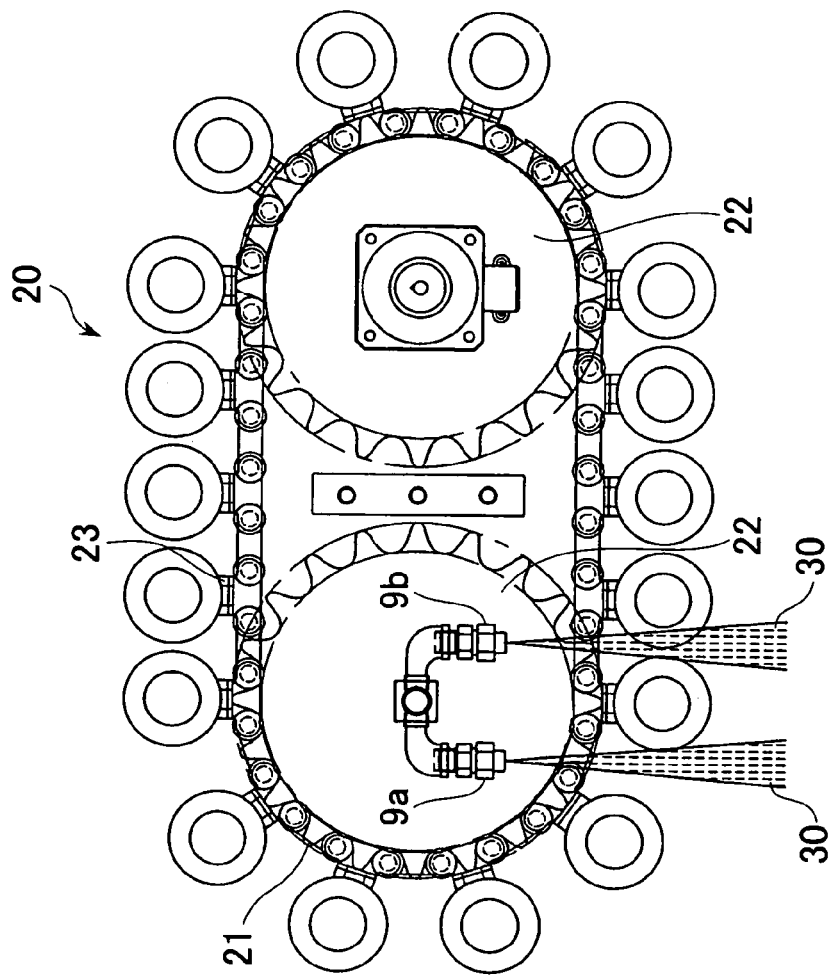
FIGS. 4a and 4b are explanatory views showing a substantial part of a third embodiment according to the present invention.

FIG. 1a is an elevation view showing a machine tool employing a tool changing device of a first embodiment of the present invention when viewed with a front cover 7 removed. FIG. 1b is a side view of the machine tool.

FIG. 2a is an enlarged front view and an enlarged side view of the tool changing device shown in FIGS. 1a and 1b.

An arm member 2 is mounted on a column 1 of the machine tool to extend horizontally, and a turret 4 for holding tools 3 is rotatably attached to the arm member 2. A spindle head 5 is supported by the column 1 to be vertically movable and a spindle 6 is provided at the spindle head 5. A tool 3 is fitted to the spindle 6 for cutting a workpiece placed on a table 11. Tool cooling nozzles 8a, 8b for supplying coolant to a machining area to cool the tool are fixed to the spindle head 5. In changing the tool 3, the spindle 6 is raised to detach the tool 3 from the spindle 6 and the turret 4 holds the detached tool 3. Thereafter, the turret 4 is rotated to select a tool 3 to be attached to the spindle 6, and the tool 3 is fitted to the spindle 6. Subsequently, the spindle 6 is descended to carry out a cutting machining on a workpiece placed on the table 11. At this moment, the coolant supplied through a coolant supply pipe 10a is spouted from the tool cooling nozzles 8a, 8b to a machining area.

The aforementioned configuration and operation are identical to those of a machine tool having a conventional tool changing device. The tool changing device according to the first embodiment is different from the conventional one in that tool cleaning nozzles 9a, 9b for cleaning contact faces of the tools 3 held by the turret 4, which are to be in contact with the spindle 6, are arranged on both sides of the spindle 6 as being fixed to the spindle head 5, and that a coolant supply pipe 10b for supplying the coolant to the tool cleaning nozzles 9a, 9b is provided.

According to the first embodiment, the tool cleaning nozzles 9a, 9b are arranged such that jets of coolant 30 supplied through the coolant supply pipe 10b and spouted from tool cleaning nozzles 9a, 9b intersect a moving course of the tools 3 held by the turret 4 when the turret 4 is rotated for selecting the tool 3, as shown in FIGS. 2a and 2b.

The tool 3 has a tapered portion 3a that is to be fitted and attached to a taper hole of the spindle 6. In the case of a double fit-type tool, the tool 3 is provided with a flange portion 3b having a surface that is brought into contact with an end face of the spindle 6. Accordingly, the tool 3 is fitted to the spindle 6 such that the tapered portion 3a of the tool is fitted to the taper hole of the spindle 6, and that the end face of the spindle 6 and the surface of the flange portion 3b contact each other. The first embodiment is designed to clean the tapered portion and the flange portion by the coolant.

According to the first embodiment, the tool cleaning nozzles 9a, 9b are fixed to the spindle head 5 to have positions and postures such that the coolant is spouted toward a region where the tapered portion 3a and flange portion 3b of the tool 3 held by the turret 4 pass when the turret 4 is rotated.

Each time the turret 4 rotates for tool selection, the coolant is spouted from the tool cleaning nozzles 9a, 9b. The tapered portion 3a and flange portion 3b of the tool 3, which are contact faces to be in contact with the spindle 6, pass through the spouted coolant 30. As a result, the turret 4 is rotated whenever the tool selection is carried out, which cleans the tool 3 held by the turret 4.

According to the first embodiment, not only the tapered portion 3a and flange portion 3b of the tool 3 to be used next but also a tapered portion 3a and flange portion 3b of the standby tools 3, which pass through the region where the coolant is spouted while the tool 3 to be used next moves to the position of the spindle 6, are cleaned at the same time in rotation of the turret 4.

In the first embodiment, the tool cleaning nozzles 9a, 9b are fixed to the spindle head 5 to make a vertical motion with the spindle head 5. Alternatively, since the turret 4 is rotated for tool selection at a predetermined position, the tool cleaning nozzles 9a, 9b may be fixed to an stationary member to spout the coolant toward the moving course of the tapered portion 3a and flange portion 3b of the tool 3 held by the rotating turret 4.

FIGS. 3a and 3b show a substantial part of a second embodiment according to the present invention, in which the tool cleaning nozzles are fastened at fixed positions. FIG. 3a is an enlarged elevation view showing a tool changing device of the second embodiment, and FIG. 3b is a side view of the tool changing device.

According to the second embodiment, the two tool cleaning nozzles 9a, 9b are fixed to the column 1 of the machine tool, and arranged on the both sides of the spindle 6 with the spindle 6 in-between, to thereby spout the coolant 30 toward regions where the tapered portion 3a and flange portion 3b of the tool 3 held by the turret 4 pass.

Also in the second embodiment, when the turret 4 is rotated for tool selection or the like, the tool cleaning nozzles 9a, 9b spout the coolant 30 supplied through the coolant supply pipe 10b, and the tool 3 held by the turret 4 passes through the spouted coolant 30, thereby cleaning the tool 3 held by the turret 4. It would be obvious that the selected tool 3 also passes through the spouted coolant 30. Therefore, even right before the tool is fixed to the spindle, the spouted coolant 30 cleans the tapered portion 3a and flange portion 3b of the tool and removes foreign matter, such as swarf.

Figure 4A:
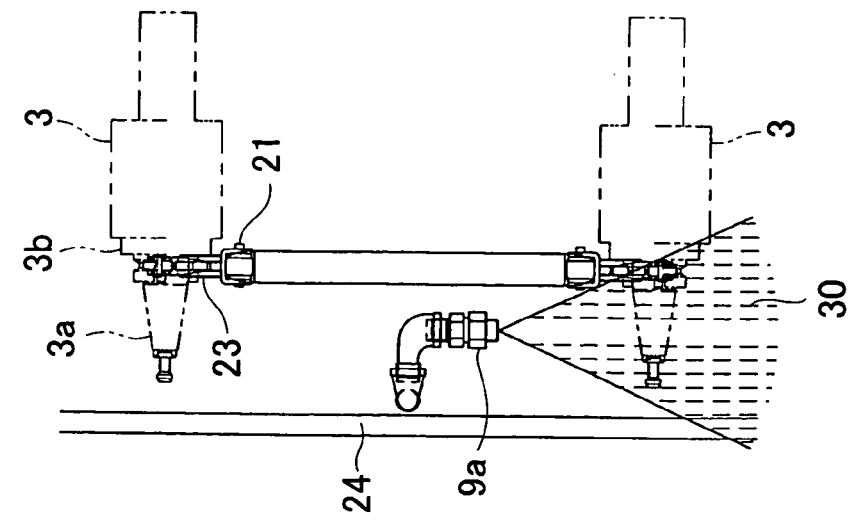

FIGS. 4a and 4b are explanatory views showing a substantial part of a third embodiment of the present invention. In the third embodiment, the present invention is applied to a tool changing device in which a magazine 20 is utilized instead of the turret as means for accommodating tools. FIG. 4a is a side view of the magazine 20 according to the third embodiment, and FIG. 4b is an elevation view of the magazine 20. The magazine 20 has a large number of pots 23 coupled to one another by chains 21, and tools 3 are accommodated in the pots 23. As illustrated in FIGS. 4a and 4b, the two tool cleaning nozzles 9a, 9b are fixed to a housing 24 or the like of the magazine 20. The tool cleaning nozzles 9a, 9b are so located as to spout the coolant 30 toward the region where the tapered portions 3a and flange portions 3b of the tools 3 held by the corresponding pots 23, which serve as contact surfaces to be in contact with the spindle, pass through.

Likewise in the third embodiment, during the tool selection, the coolant 30 is spouted from the tool cleaning nozzles 9a, 9b. Moreover, sprockets 22 are driven to rotate the chains 21, and the pots 23 and the tools 3 accommodated in the corresponding pots 23 are then rotated, thereby carrying out the tool-selecting operation. At this point, the tools 3 pass through the coolant 30 spouted from the tool cleaning nozzles 9a, 9b. This cleans the tapered portions 3a and flange portions 3b of the tools 3, which are the contact faces to be in contact with the spindle 6. Consequently, the tools 3 accommodated in the magazine 20 are cleaned whenever the tool selection is performed, and whenever the chains 21 are rotated.

Figure 5G:
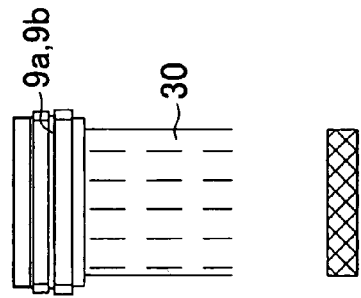
FIGS. 5a through 5h show machining fluid-spouting shapes to explain coolant-spouting shapes of tool cleaning nozzles used in the embodiments.
Figure 5H:
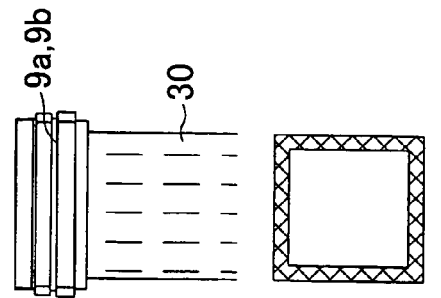
Figure 5E:
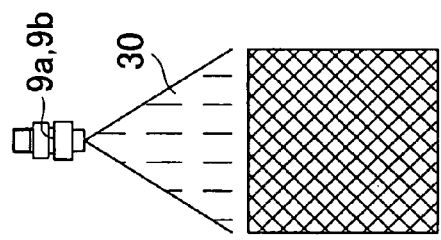
Figure 5F:
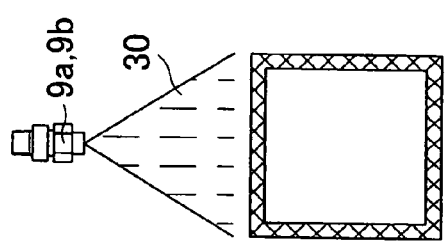
Figures 5A, 5B, 5C:
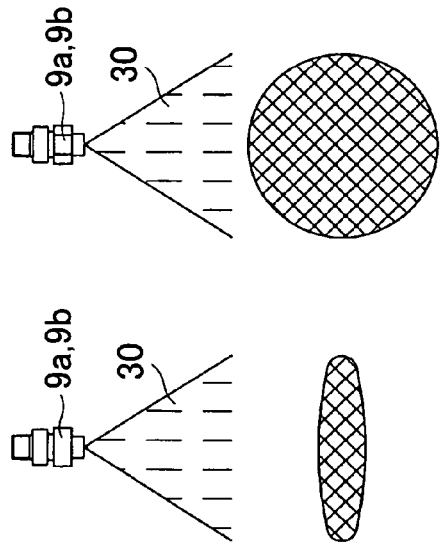
Figure 5D:
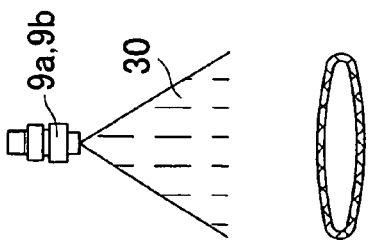

FIGS. 5a through 5h show machining fluid-spouting shapes according to various coolant-spouting shapes of the tool cleaning nozzles 9a, 9b, which are employed in the first, second and third embodiments. FIGS. 5a and 5b each show a tool cleaning nozzle that spouts the coolant 30 in the shape of a fan. The nozzle shown in FIG. 5a is a solid fan-shaped nozzle that spouts the coolant 30 so as to fill the inside of an outline of the fan with the liquid, whereas the one shown in FIG. 5b is a fan-shaped nozzle in which the inside of outline of the fan is hollow. The FIG. 5c shows a solid circular cone-shaped nozzle that spouts the coolant in the shape of a circular cone so as to fill the inside of the cone with the liquid, whereas FIG. 5d shows a circular cone-shaped nozzle in which the circular cone is hollow in the inside. The nozzle shown in FIG. 5e is a solid pyramid-shaped nozzle that spouts the coolant in the shape of a pyramid so as to fill the inside of the pyramid with the liquid, whereas the one shown in FIG. 5f is a pyramid-shaped nozzle in which the pyramid is hollow in the inside. FIG. 5g is a solid pillar-shaped nozzle that spouts the coolant so as to fill the inside of the pillar with the liquid, whereas FIG. 5h shows a pillar-shaped nozzle in which the pillar is hollow in the inside.

As for the tool cleaning nozzles 9a, 9b used in the first, second and third embodiments, either one of the tool cleaning nozzles that form various spouting shapes of the coolant 30, shown in FIGS. 5a through 5h, may be employed.

According to each of the embodiments, in response to a tool selection command, the coolant 30 is spouted from the tool cleaning nozzles 9a, 9b simultaneously with the rotation of the turret 4 or magazine 20. Alternatively, the coolant 30 is spouted from the tool cleaning nozzles 9a, 9b before the output of the tool selection command, and subsequently the tool selection command is outputted to rotate the turret 4 or the magazine 20. When the tool 3 is selected as a result, the tool 3 accommodated in the turret 4 or magazine 20 passes through a film of the coolant 30 spouted from the tool cleaning nozzles 9a, 9b. When passing through the film, the tapered portion 3a and flange portion 3b of the tool 3 are cleaned by the spouted coolant 30, which removes foreign matter, such as swarf, adhered to the tapered portion 3a and the flange portion 3b. Next, the tool is selected, and the spout of the coolant is finished after the rotation of the turret 4 or magazine 20.

When the coolant 30 is spouted from the tool cleaning nozzles 9a, 9b in conjunction with the rotation of the turret 4 or magazine 20 for tool selection as described above, the cleaning process is carried out each time the tool is selected. Therefore, not only the tool 3 to be used but also the standby tool 3 accommodated in the turret 4 or magazine 20 is subjected to the cleaning process. Consequently, the swarf and the like, which are adhered to the tapered portion 3a and the flange portion 3b in the turret 4 or magazine 20 during the standby period, are also cleaned up and removed before bond strength thereof increases.

Furthermore, the rotation of the turret 4 or magazine 20 does not have to be made during the tool selecting period. On the contrary, the tool 3 may be regularly or voluntarily cleaned by rotating the turret 4 or the magazine 20 regularly or voluntarily to spout the coolant 30 from the tool cleaning nozzles 9a, 9b. Although the coolant 30 is spouted from the tool cleaning nozzles 9a, 9b in the aforementioned embodiments, fluid, such as air, may be spouted in place of the coolant 30. In addition, the tool cleaning nozzles 9a, 9b are so arranged as to sandwich the spindle on the both sides thereof, and the coolant or the air is spouted toward the tool passing below the spindle. It is also possible that only one tool cleaning nozzle may be arranged on one side of the spindle instead of on the both sides thereof. A cleaning property in this case, however, is weaker than in the case that the nozzles are provided on the both sides of the spindle.

What is claimed is:

1. A tool changing device for a machine tool, comprising:
   a turret for holding tools to be used changeably in the machine tool; and
   one or more nozzles each for spouting coolant or air toward a region where the tools held by said turret pass in rotation of said turret,
   wherein the nozzles are attached to both sides of a spindle head of the machine tool to have positions and postures such that the coolant or air spouted from each nozzle is directed away from a spindle of the machine tool toward a region where tapered portions of the tools held by said turret pass in rotation of said turret.

2. A tool changing device for a machine tool according to claim 1, wherein the nozzles have positions and postures such that the coolant or air spouted form each nozzle is directed toward a region where the tapered portions and also flange portions of the tools held by said turret pass in rotation of said turret.

3. A tool cleaning method for cleaning tools held by a turret of a tool changing device, comprising:
   providing one or more nozzles adjacent to a spindle head of the machine tool, each for spouting coolant or air outwardly from a spindle of the machine tool toward a region where the tools held by the turret pass in rotation of the turret; and
   spouting the coolant or air from said one or more nozzles while the turret is rotated, so that tapered portions of the tools are cleaned by subjecting the tools to the spouted coolant or air when the tools pass the region toward which the coolant or air is spouted.

4. A tool cleaning method according to claim 3, wherein the spouting of the coolant or air is performed so that the tapered portions and also flange portions of the tools are cleaned by subjecting the tools to the spouted coolant or air when the tools pass the region toward which the coolant or air is spouted.

5. A tool cleaning method according to claim 3, wherein the spouting of the coolant or air is performed when the turret is rotated for selecting a tool to be used.

* * * * *